United States Patent [19]

Maluo

[11] Patent Number: 4,951,216

[45] Date of Patent: Aug. 21, 1990

[54] PATTERN DRAWING APPARATUS USING CHARGED BEAMS

[75] Inventor: Masayuki Maluo, Numazu, Japan

[73] Assignee: Toshiba Machine Company, Ltd., Tokyo, Japan

[21] Appl. No.: 161,098

[22] Filed: Feb. 26, 1988

[30] Foreign Application Priority Data

Feb. 26, 1987 [JP] Japan .................................. 62-43576

[51] Int. Cl.⁵ ...................... G06F 15/40; H01J 37/302
[52] U.S. Cl. .................................. 364/490; 364/489; 364/488; 250/400; 250/492.3
[58] Field of Search ............... 364/488, 489, 490, 491; 250/398, 400, 492.21, 492.22, 492.23, 492.24

[56] References Cited

U.S. PATENT DOCUMENTS

| 4,457,803 | 7/1984 | Takigawa | 250/492.22 |
|---|---|---|---|
| 4,482,810 | 11/1984 | Cooke | 250/492.22 |
| 4,503,329 | 3/1985 | Yamaguchi et al. | 250/492.22 |
| 4,528,634 | 7/1985 | Nakahata et al. | 364/491 |
| 4,586,141 | 4/1986 | Yasuda et al. | 250/492.22 |
| 4,647,782 | 3/1987 | Wada et al. | 250/492.22 |
| 4,653,020 | 3/1987 | Cheselka et al. | 364/900 |
| 4,718,019 | 1/1988 | Fillion et al. | 364/491 |
| 4,807,159 | 2/1989 | Komatsu et al. | 364/571.02 |

Primary Examiner—Parshotam S. Lall
Assistant Examiner—V. N. Trans
Attorney, Agent, or Firm—Oblon, Spivak, McClelland, Maier & Neustadt

[57] ABSTRACT

A re-size circuit extracts the bit data of a pattern to be drawn, at a specific address and its adjacent addresses of a pattern to be drawn, from a bit map memory storing LSI pattern data. For the Data at the adjacent addresses, either "0" or "1" re-size parameter data is set according to the contents of the re-size directions. The thickness of the pattern is altered by means of the logical operation of the data at the adjacent addresses and the re-size parameter data.

4 Claims, 7 Drawing Sheets

|  | S0 | S1 | S2 | S3 | S4 | S5 | S6 | S7 | S8 |
|---|---|---|---|---|---|---|---|---|---|
| 70-0 | A-15 | B-0 | B-1 | D-15 | E-0 | E-1 | G-15 | H-0 | H-1 |
| 70-1 | B-0 | B-1 | B-2 | E-0 | E-1 | E-2 | H-0 | H-1 | H-2 |
| 70-2 | B-1 | B-2 | B-3 | E-1 | E-2 | E-3 | H-1 | H-2 | H-3 |
| 70-15 | B-14 | B-15 | C-0 | E-14 | E-15 | F-0 | H-14 | H-15 | I-0 |

PATTERN DRAWING APPARATUS USING CHARGED BEAMS

BACKGROUND OF THE INVENTION

1. Field of the Invention

This invention relates to a pattern drawing apparatus for drawing a desired pattern on an object by using charged beams, such as electron beams, ion beams, or the like, and more particularly to a charged beam pattern drawing apparatus with a pattern re-size function.

2. Description of the Related Art

In recent days, various types of electron beam pattern drawing apparatuses have been developed and used for drawing desired patterns on the object such as semiconductor wafers and masks. In this type of pattern drawing apparatus, the data of a pattern of IC as prepared by CAD (computer aided design) technique, such as LSI, is converted into bit data, which is used in the pattern drawing by electron beams. By the bit data, the on and off of the beam are appropriately controlled, to form a desired pattern on the object.

In the development of LSI, the thickness of a pattern is frequently changed in order to make a fine adjustment of the electric characteristic thereof. This pattern thickness change is called a "re-size". In the conventional re-size technique, it is often required to re-design the pattern to change its thickness by the CAD, or to modify the drawing data provided for the drawing apparatus by using a conversion software. This re-size work is time consuming and troublesome, hindering the development of the LSI.

In modifying the CAD data for re-size processing, it is necessary to give instructions, which change the sizes of a number of LSI patterns. In this case, the converted data must be further processed so as to convert the data format used in the pattern drawing apparatus. The execution of the conversion program used for re-sizing the drawing data of the pattern drawing apparatus takes longer to accomplish, if the drawing data is complicated. Generally, LSI includes a combination of patterns consisting of 10 to 20 stacked layers. The above re-sizing process must be applied to all these patterns. Thus, the conventional re-sizing process requires allot of time and effort, even when the degree of re-size of the LSI pattern is small.

As described above, employing the conventional re-size technique requires allot of time and effort, thereby making the re-size processing quite difficult. The same problem not only exists in the electron beam pattern drawing apparatus, but also in a charged beam such as the ion beam pattern drawing apparatus.

SUMMARY OF THE INVENTION

Accordingly, an object of this invention is to provide a charged beam pattern drawing apparatus which can re-size a pattern within a real time fashion by merely setting incremental or decremental values of the pattern in a hardware, thereby providing easy re-size processing and an improved IC development.

This invention is based on a basic idea that after the pattern data is converted into bit data, the converted bit data is used in re-size process by using a hardware.

According to this invention, there is provided a charged beam pattern drawing apparatus including a bit data conversion circuit for converting IC pattern data into bit data, a bit map memory for storing the bit data from the bit data conversion circuit, a read circuit for reading out bit data from the bit map memory and applying it to a beam blanker electrode for controlling on/off of charged beams; and a re-size circuit inserted between the bit map memory and the read circuit, and for changing the size of a pattern expressed by the bit data.

The charged beam pattern drawing apparatus is improved in that the re-size circuit comprising: output extracting means for extracting the bit data stored in the bit map memory, which correspond to a specific address in a processed pattern and a plurality of addresses surrounding and adjacent to the specific address; re-size parameter setting means for setting "1" or "0" to each of the adjacent addresses depending on the direction of the re-sized pattern expansion or contraction; and logic-/arithmetic means for logically operating the data at the plurality of adjacent addresses surrounding the specific address, which are extracted by the output extracting means, and the data corresponding to the adjacent addresses as set by the re-size parameter setting means, to determine the bit data at the specific address, and to supply it to the read circuit.

The charged beam pattern drawing apparatus according to this invention can re-size a pattern on the basis of the bit data, by means of the re-size circuit including output extracting means, re-size parameter setting means and logic/arithmetic means. In other words, the pattern data of IC is converted into bit data, and then the converted bit data is re-size processed by the hardware. Therefore, the re-size processing and the normal pattern drawing can be executed concurrently or in a real time manner, and minimizes an increase of the pattern drawing time, and saves the labor for the re-size processing.

The boundary between the drawing frames is processed such that the boundary or final part of the frame to be in contact with the next frame is picked up over a predetermined width, and the data representing it is stored in the memory. In drawing the next frame, this picked up data is read out and appropriately processed. If so done, the boundary part may also be re-sized normally. The re-size processing is performed by using operators using gate logics. If a plurality of bits, e.g., 16 bits, are used and processed in a parallel fashion, the re-size processing can be executed at a high speed.

DETAILED DESCRIPTION OF THE PREFERRED EMBODIMENTS

A preferred embodiment of a charged beam pattern drawing apparatus according to this invention, will be described referring to the accompanying drawings.

Figure 1:
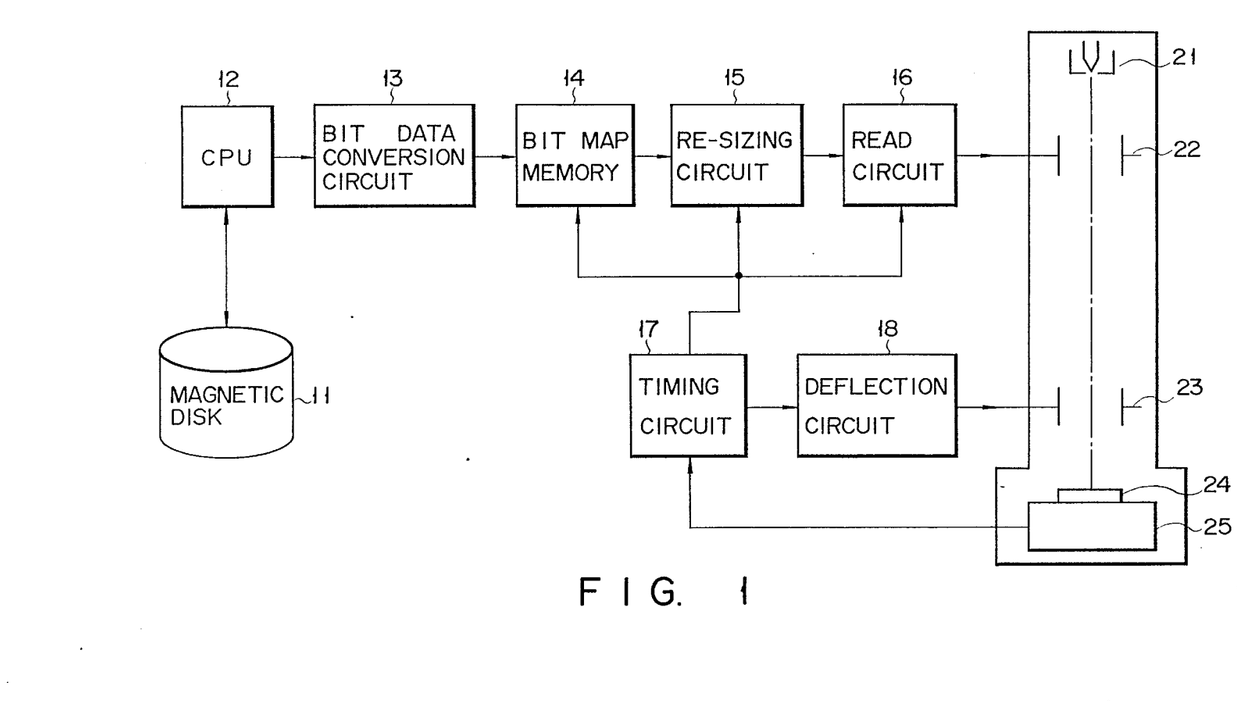
FIG. 1 shows a schematic and block diagram of an electron beam pattern drawing apparatus according to an embodiment of this invention.

FIG. 1 is a schematic illustration of a electron beam pattern drawing apparatus, according to one embodiment of this invention. A pattern configuration of LSI, for example, is handled as a colligation of unit patterns on data patterns expressed by figures which represent the outer dimensions and positions of the unit patterns. This apparatus is of the raster scan type. In the apparatus, the unit pattern data is converted into bit data, and the data turns the beam on and off, to depict a desired pattern on an object such as a semiconductor wafer.

The pattern data stored in magnetic disk 11 is read out by CPU 12 from the disk 11, and transferred to bit data conversion circuit 13. This circuit 13 converts the pattern data into bit data which is stored in bit map memory 14. The data stored in bit map memory 14 is read out by read circuit 16 through re-size circuit 15, and it is applied, in the form of serial data, to blanking deflector 22 of an electron beam optical system. Timing circuit 17 containing a distance sensor combined with a laser (not shown), detects the movement of stage 25 which has an object, wafer 24 placed thereon. Timing circuit 17 produces one pulse every time it is moved 0.5 $\mu$ equal to the beam diameter. With every 0.5 $\mu$ movement of stage 25, a pulse is produced, and the bit data is read out in synchronism with these generated pulses. Timing circuit 17 sends the timing signal to trigger the sweep signal generator provided in the deflection 18 which is then applied to beam scan deflector 23. The electron beam emitted from electron gun 21 is turned on and off by the bit data while it is scanned on the object 24. As a result, an intended pattern is depicted on wafer 24.

The electron beam pattern drawing apparatus thus arranged is different from the conventional apparatus in that the former has a real time re-size function provided in re-size circuit 15 between bit map memory 14 and read circuit 16. The re-size function will be explained. The bit data stored in bit map memory 14 is read out in a parallel fashion (for example, 8 or 16 parallel bits), with progression of the drawing operation of a pattern. Then, the bit data is subjected to re-size processing by the pipeline in re-size circuit 15. Then, the data is transferred to read circuit 16 where it is converted into serial data. In turn, the serial data is used for controlling the on/off operation of the beam. Therefore, the preparatory processing required before the pattern is drawn, involves setting up re-size circuit 15, and reading out the data from bit map memory 14 to be first used for the pattern drawing, and re-sizing the read out data. This previous reading of the data allows the data to be transferred to read circuit 16 before the arrival of the timing signal to start each raster scanning. The remaining data is progressively processed by the pipeline in synchronism with the timing signal, and transferred to read circuit 16. Therefore, during the pattern drawing, additional time for re-sizing is required.

Figure 2:
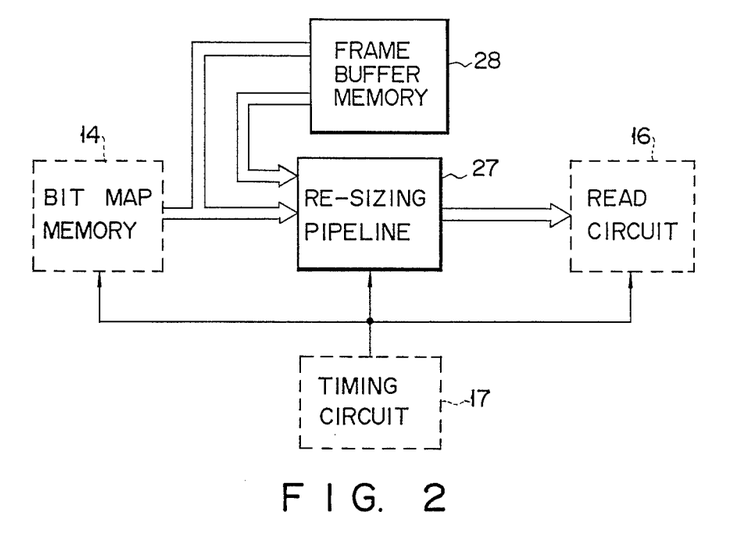
FIG. 2 is a block diagram showing an example of a re-size circuit used in the FIG. 1 circuit.

Turning now to FIG. 2, there is shown an example of an arrangement of re-size circuit 15. Re-size circuit 15 is composed of re-size pipeline 27 and frame buffer memory 28. In this instance, the bit data which is of 16-bit parallel data read out from bit map memory 14 is caused to flow into pipeline 27. The re-sized bit data (16-bit parallel) is transferred to read circuit 16. In this case, the boundary part of each frame must be drawn normally. An end part (corresponding to 32 bits) of the end portion of a preceding frame is sent to pipeline 27 and frame buffer memory 28 pattern of this frame is drawn, and is stored in frame buffer memory 28. This data is added to the head of the next frame to be drawn, and sent to re-size pipeline 27 to be subjected to an appropriate operation. In preparation for the following frame processing, the final part of that frame is stored in frame buffer memory 28. The processing of these boundary parts of frames is carried out under the control of timing circuit 17. Thus, by processing the data of boundary parts of two frames as has been described above, a correct re-sizing can be performed.

Figure 3:
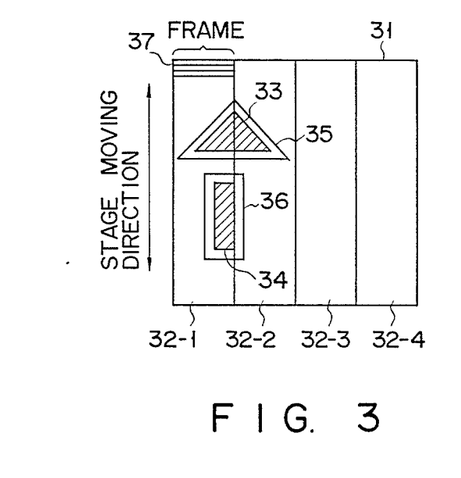
FIGS. 3 and 4 show views for explaining how to re-size a pattern ranging two adjacent frames.

FIG. 3 shows how to re-size a pattern ranging two adjacent frames. In the raster scan type of the pattern drawing apparatus, the raster width, or the beam deflection width is limited to a specific value. In order to draw an area 31 of one pattern, it must first be divided into a number of unit sections 32, called frames. In FIG. 3, these frames are designated by 32-1 to 32-4. For the raster scanning, a horizontal caster scanning operation for first frame 32-1 is vertically performed from top to bottom. Upon completing the scanning of this frame, stage 25 moves 256 $\mu$ or 512 $\mu$, for example, and caster scan of the second frame 32-2 is vertically performed from bottom to top. This scanning operation continues until the final frame has been scanned. Therefore, for re-sizing pattern 33 extending two adjacent frames or pattern 34 located near the frame boundary, for processing one of these adjacent frames, the data of the adjacent frame is required. Frame buffer memory 28 is used in utilizing the data of the adjacent frame. Expanded areas 35 and 36 are obtained by plus re-sizing patterns 33 and 34. Reference 37 designates one scanning (one raster) beam.

Figure 4:
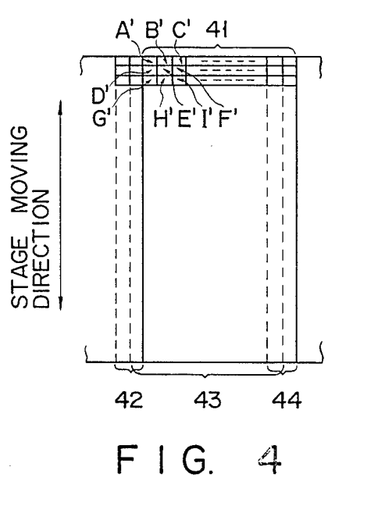

FIG. 4 is a view showing how to set up the best relationship of a pattern in one frame to the pattern in the adjacent frame, for the re-size processing. This will be described using a hardware shown in FIG. 2. Pattern data 41 from bit map memory 14 is transferred frame by frame to re-size pipeline 27. Frame buffer memory 28 has stored data 42 whose width is two times the maximum re-size amount of the data in the previous frame. These pieces of data 41 and 42 are consecutively applied to re-size pipeline 27. A partial data 43 of the processed data, which is shifted toward the previous frame by the maximum re-size amount, is transferred to read circuit 16. In preparation for the next frame processing, a part 44 (two times the maximum re-size amount) of pattern data 41, which is in contact with the next frame, is stored in frame buffer memory 28.

When the above processing is applied to all of the frames, the relationship of the pattern in one frame to that in the adjacent frame is well re-sized, providing a natural pattern drawing at the frame boundary. In the top frame, the data 42 in FIG. 4 is treated as dummy data "0". The final part of the last frame (16 bits in the right end portion) has not been used for pattern drawing, and still left in frame buffer memory 28. Instead of that data 42 and data 41 from bit map memory 14, the data of one frame is prepared by using the dummy data "0". Therefore, the number of frames to be drawn is one frame larger than that of actual frames. The time taken for the additional one frame to be drawn is negligible when compared with a total of time for drawing all of the frames.

Figure 5:
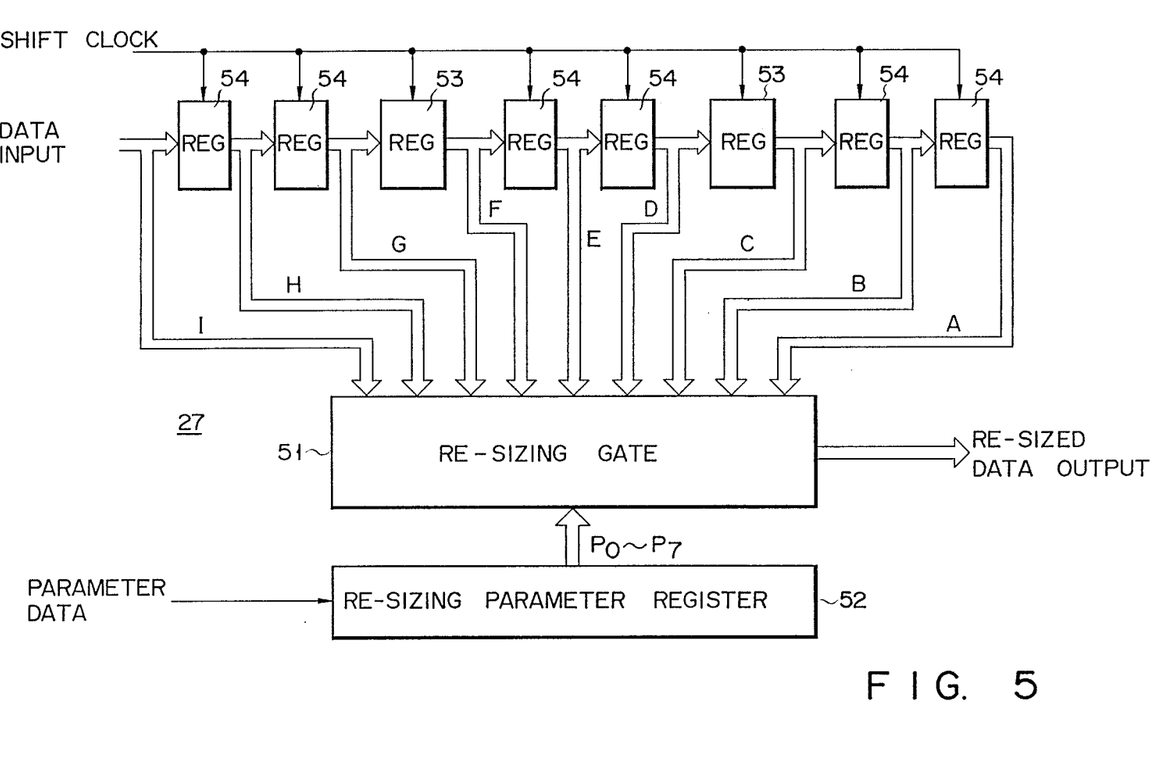
FIG. 5 is a block diagram showing an example of a re-size pipeline.

FIG. 5 shows a block diagram showing a detailed arrangement of re-size pipeline 27. In this instance, the bit data transferred in the 16-bit parallel are re-sized in parallel. This implies that the re-size processing is executed at a speed sixteen times the shift period of bit data. Re-size pipeline 27 is composed of re-size gate (logic operation means) 51 for re-size operation, re-size parameter register (re-size parameter setting means) 52 for designating the directionality of the re-size, 16 bits×64 stages shift register 53 as output extracting means, and 16 bits×1 stage register 54. In this instance, the width of one frame is 1024 bits, the data in one frame buffer memory 28 is 32 bits (16 bits×2). Accordingly, the data of the 3×3 matrix data (e.g., A′ to I′ shown in FIG. 4 are simultaneously applied to re-size gate 51.

The data of one scan is first read out from frame buffer memory 28 two times and supplied to re-size pipeline 27 in a 16-bit parallel fashion. Succeedingly, the one-scan data is read out from bit map memory 14, 64 times (64×16=1024 bits). These read data is propagated in synchronism with the shift clock signal, through shift register 53 and register 54, which are serially coupled. Thus, the data is sequentially transferred, with the data unit of one scan, and the data of one frame is successively processed.

Figure 6:
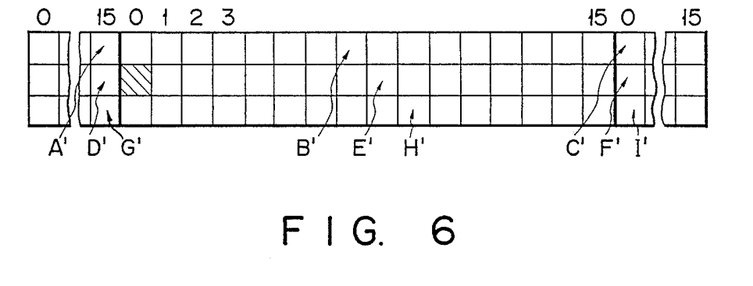
FIG. 6 shows an expanded view showing a part of the FIG. 4 drawing.

Re-size parameter register 52 has stored 8-bit parameter data P0 to P7 designating the directionality of the re-size. The parameter data, and the data derived from shift register 53 and register 54 is processed by re-size gate 51 and output therefrom in a 16-bit parallel fashion. The parameter data P0 to P7 is set when the CPU is initialized. The data successively input to re-size pipeline 27 is re-size processed and output (pipeline processed). In FIG. 6, A′ to I′ designate the image of the data, which is input to re-size gate 51 at a certain clock. This image corresponds to A′ to I′ in FIG. 4. The image data A′ to I′ correspond to 16 bits of one line data (1024 bits).

FIG. 6 shows an expanded view of the image data A′ to I′ shown in FIG. 4. As in the previous case, the output signals A to I of the respective registers correspond to data A′ to I′, respectively. For ease of illustration, the bit positions (addresses) of the data are expressed by numerals 0 to 15, and their addresses by (A-0) to (I-15). The illustration of FIG. 6 is a part of data to be drawn. A state that the frame data successively appear every 16 bits in the data window, is imaged.

Figure 7:
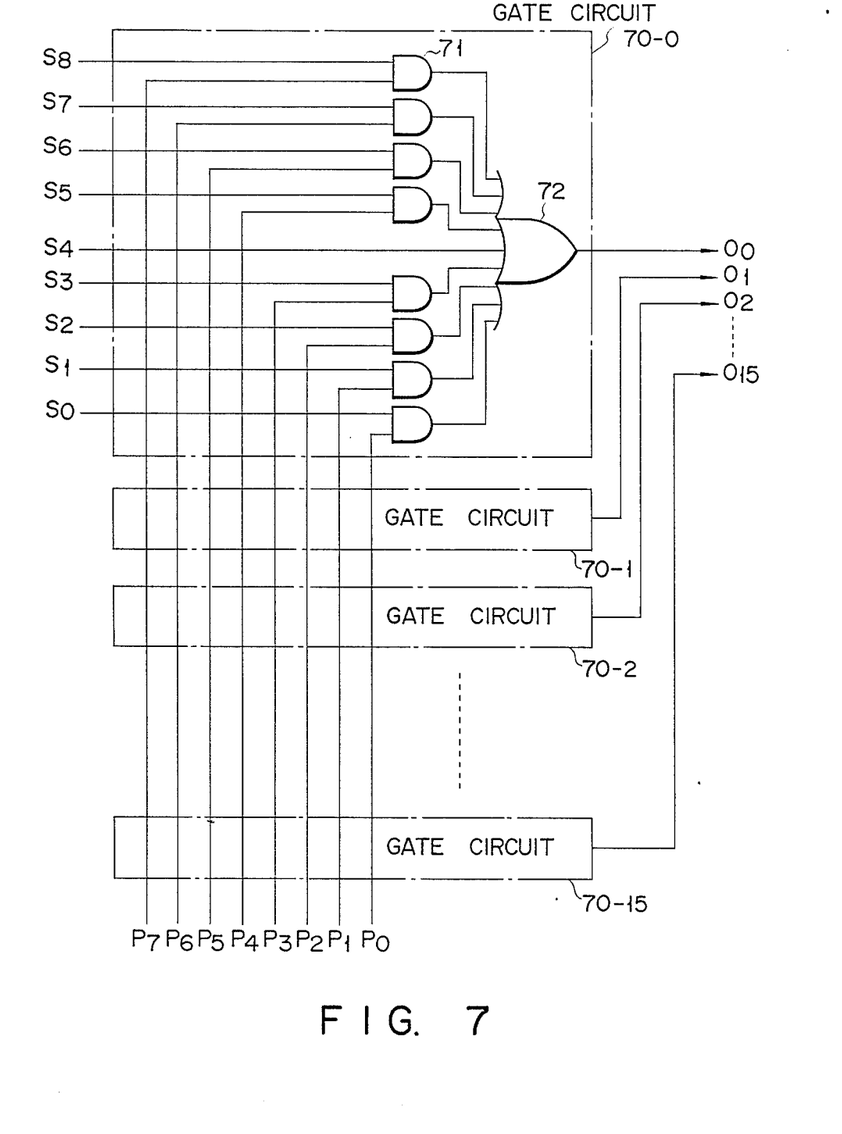
FIG. 7 shows a circuit diagram of a re-size gate.
Figure 8:
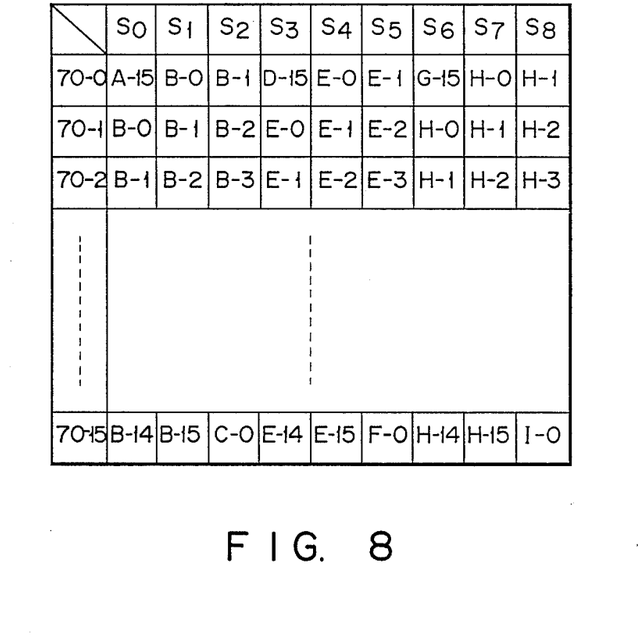
FIG. 8 shows the data input to the re-size gate.

FIG. 7 shows a circuit arrangement of an example of re-size gate 51. This circuit functions to make a plus-re-size of one bit (making the pattern thicker by one bit). Re-size gate 51 comprises 16 gates 70 (70-0 to 70-15). Each gate 70 is a combination of eight AND gates 71 with two inputs and a single OR gate 72 with nine inputs. The first input terminals of AND gates 71 are coupled with re-size parameters P0 to P7, respectively. The second input terminals S0 to S8 of these gates are coupled with the data of the center address of a processed pattern and peripheral addresses (see FIG. 8). For example, the input terminals S0 to S8 of the first stage gate 70-0 are connected to the data (A-15, B-0, B-1, D-15, E-0, E-1, G-15, H-0, H-1) with E-0 as the center address. Similarly, gate circuits 70-1 to 70-15 are coupled with the data with (E-1) to (E-15) as the center addresses.

In operation of gate 70-1, when a processed pattern extends from the center address (E-0) to its peripheral addresses, the pattern is expanded around the center address. The same thing is true for the remaining gates 70-1 to 70-15. Re-size parameters P0 to P7 are used for directing the re-size. When a pattern is re-sized to make it thick equally in all of the directions, these parameters are all 1's.

Figure 9:
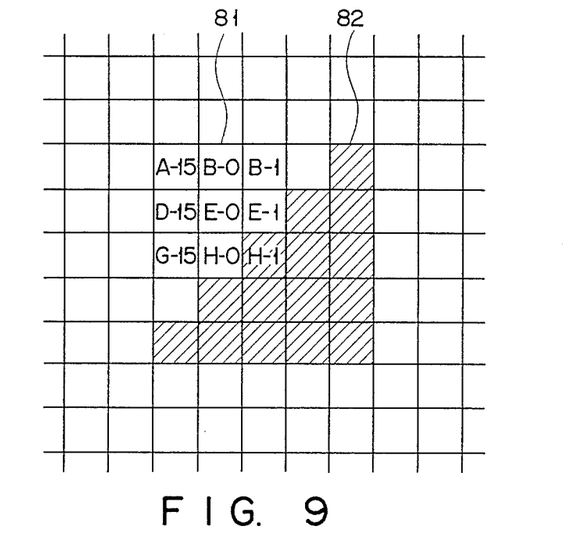
FIGS. 9 and 10 show views for explaining a principle of the re-size processing.
Figure 10:
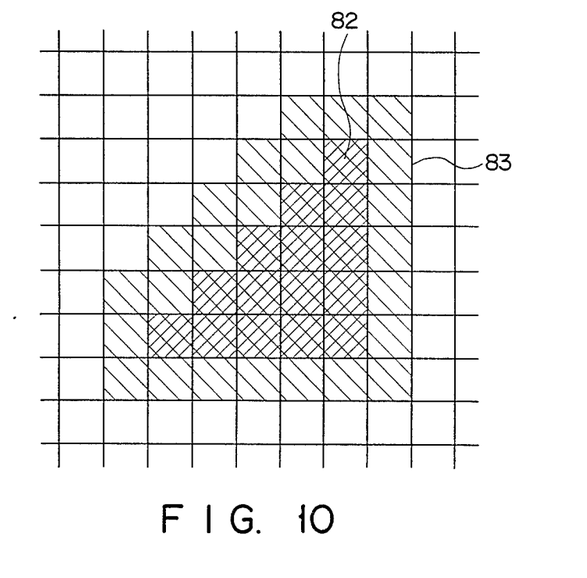
Figure 11:
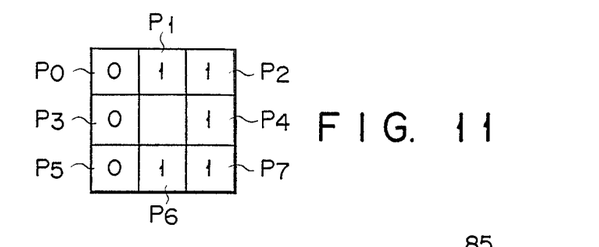
FIG. 11 shows a view illustrating other re-size parameters.
Figure 12A:
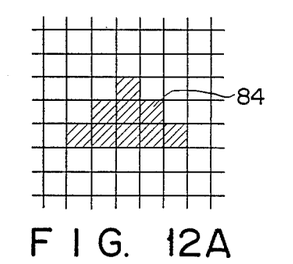
FIGS. 12A and 12B show a view showing a pattern expansion when the pattern is processed by the re-size parameters.
Figure 12B:
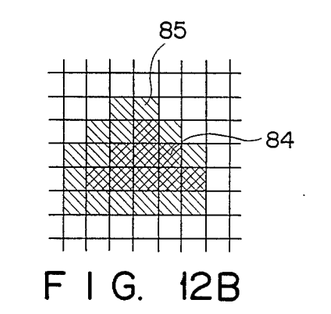

FIG. 9 shows how a matrix operator or element of 3×3 processes a pattern 82. One (H-1) of the peripheral addresses of the center address (E-0) of element 81 contains data of the pattern. Therefore, the pattern is expanded around the center address. The element 81 is sequentially scanned as in the raster scanning method, thereby to execute the re-size processing. FIG. 10 shows a pattern denoted as 83 as the re-sized pattern. When pattern 84 shown in FIG. 12A is re-sized by using parameters in which parameters P0, P3 and P5 are 0's and the remaining ones are 1's as shown in FIG. 11, pattern 85 is obtained as shown in FIG. 12B. As seen, the re-sized pattern is made thick in the up and down directions, and to the left. In this way, a re-sized pattern may have directionalities in configuration by changing re-size parameters.

Thus, the pattern drawing apparatus according to this invention can expand an IC pattern in a desired direction by merely setting re-size parameters to appropriate values. In this case, the re-size processing is executed by means of the hardware including re-size gate 51, re-size parameter register 52, registers 53 and 54, and the like. This enables the re-size processing to progress concurrent with the electron beam drawing. Therefore, the re-size processing is possible without any increase of the drawing time, making it easy to change the size of the LSI pattern. Further, there is no need for re-design the pattern by the CAD, and/or the converting the pattern data by a computer. These features are very advantageous in the re-size processing.

It is evident that this invention is not limited to the above-mentioned embodiment. For example, the operation by the re-size pipeline is for the plus re-size of one bit. If a plurality of the pipelines are used, the re-size of multi-bits is possible. While the 3×3 matrix is used for the operation, a 5×5 matrix may be used. In this case, the 2-bit re-size is executed by a single operation. A 7×7 matrix enables a 3-bit re-size by the single operation. A $(2n+1)\times(2n+1)$ enables gives an n-bit re-size by the single operation.

Figure 13:
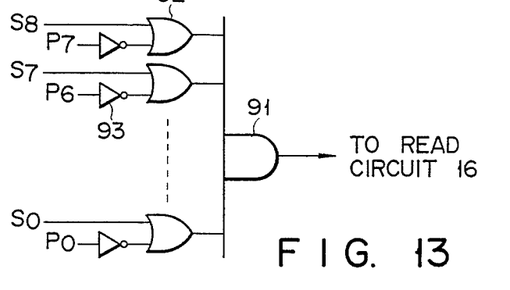
FIGS. 13 and 14 show circuit arrangements showing modifications of the FIGS. 7 and 2, respectively.

An example of a minus-re-size element is illustrated in FIG. 13. As shown, element contains AND gates 91 with 8 inputs, eight OR gates 92 with 2 inputs, and eight inverters 93. In this arrangement, when input data S0 to S8 contain "0", even if the number of the "0" data is one, if the re-size parameter corresponding to it is "1", "0" output for the minus re-size output, is forcibly output from AND gate 91. As a result, the pattern is thinned at each specified address.

Figure 14:
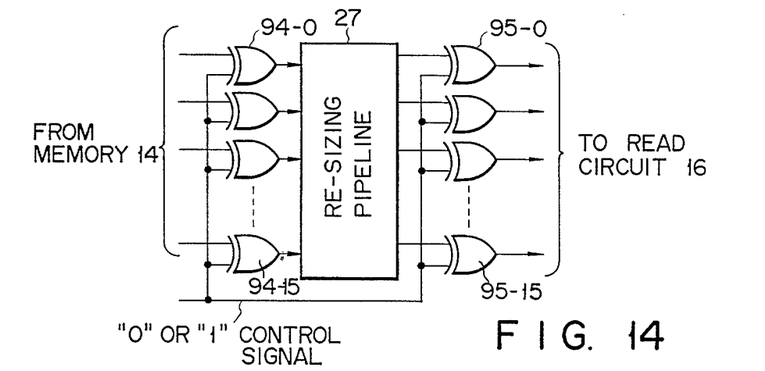

Another example of the plus or minus-re-size pipeline is shown in FIG. 14. As shown, 16 exclusive OR gates 94-0 to 94-15 and 95-0 to 95-15 are connected to the input and output of re-size pipeline 27, respectively. In this arrangement, the plus-re-size is selected by setting a re-size control signal ("0" or "1" control signal) to "0", and the minus-re-size is selected by setting to "1". Specifically, when the re-size control signal of "0" is applied to one of EX-OR gates 94-0 to 94-15, the input bit data is applied to pipeline 27 without any modification, so that the pipeline executes the plus-re-size processing. When the re-size control signal is "1", the input bit data is inverted and sent to the pipeline, so that the minus re-size processing is executed.

As seen from the foregoing, the IC pattern of LSI, for example, can be re-sized in a simple way by the hardware. Further, the re-size processing can be done concurrently with the electron beam drawing. These features save the time and labor for re-size processing. In this respect, this invention greatly contributes to the semiconductor industry.

What is claimed is:

1. A raster scan type charged beam pattern drawing apparatus including a bit data conversion circuit for converting IC pattern data into bit data which is in a one-to-one correspondence with a pattern to be drawn by the IC pattern data, a bit map memory for storing the bit data from said bit data conversion circuit, and a read circuit for reading out bit data from said bit map memory in synchronism with a scanning operation of a charged beam having a fixed size, and applying the bit data to means for controlling on/off of charged beams; wherein said apparatus comprises:

a pattern re-size circuit for selectively magnifying and reducing the size of a part of a peripheral portion of a pattern expressed by the bit data without changing a portion thereof said re-size circuit comprising an output extracting means for extracting the bit data stored in said bit map memory, which corresponds to a specific address in a processed pattern and a plurality of adjacent addresses surrounding said specific address;

re-size parameter setting means for setting data either "1" or "0" corresponding to each of said adjacent addresses, depending on the direction of magnification and reduction of the re-sized pattern; and logic/arithmetic means for logically operating the data at the plurality of adjacent addresses surrounding said specific address, which is extracted by said output extracting means, and the data corresponding to said adjacent addresses as set by said re-size parameter setting means, to determine the bit data at said specific address, and to supply it to said pattern re-size circuit.

2. A raster scan type pattern drawing apparatus according to claim 1, in which said output extracting means and said logic/arithmetic means include a plurality of stages of them to process the data of a plurality of bits in a parallel fashion.

3. A raster scan type pattern drawing apparatus according to claim 1, in which said output extracting means is a combination of one stage of register and a multiple of stages of shift registers corresponding to one line of frames.

4. A raster scan type pattern drawing apparatus according to claim 1, in which a frame buffer memory is inserted between said bit map memory and said re-size circuit, and stores bit data representing a predetermined width of a part of one frame where said frame contacts the succeeding frame, said partial frame bit data contained in the bit data, which represents a plurality of frames constituting a processed pattern and are transferred from said bit map memory, and when the bit data of the succeeding frame is read out, said partial frame bit data is added to the read out bit data, and the total of the data is transferred to said re-size circuit.

* * * * *